United States Patent

[11] 3,576,068

[72] Inventors James F. Justice
　　　　　　　　Dearborn, Mich.;
　　　　　　　　Ralph W. Yocum, Peoria, Ill.
[21] Appl. No. 769,570
[22] Filed Oct. 22, 1968
[45] Patented Apr. 27, 1971
[73] Assignee Caterpillar Tractor Co.
　　　　　　　　Peoria, Ill.

[54] FRICTION WELDING A MULTIPART SPRING-LOADED ASSEMBLY
2 Claims, 2 Drawing Figs.

[52] U.S. Cl............................................. 29/470.3,
　　　　　　　　　　　　　　　　　　　　29/157.1, 156/73, 228/2
[51] Int. Cl............................................. B23k 27/00
[50] Field of Search............................................. 228/2;
　　　　　　　　　　　　　　　　29/470.3, 157.1; 156/73

[56] References Cited
UNITED STATES PATENTS

| | | | |
|---|---|---|---|
| 2,933,428 | 4/1960 | Mueller | 29/470.3X |
| 3,002,870 | 10/1961 | Belgarde et al. | 156/73X |
| 3,078,912 | 2/1963 | Hitzelberger | 156/73X |
| 3,090,263 | 5/1963 | Laverty et al. | 228/2 |
| 3,149,410 | 9/1964 | Dornbos | 29/156.7 |
| 3,340,114 | 9/1967 | Taylor et al. | 156/73 |
| 3,344,010 | 9/1967 | Franz | 228/2X |
| 3,504,425 | 4/1970 | Sutovsky et al. | 29/470.3 |

Primary Examiner—John F. Campbell
Assistant Examiner—Robert J. Craig
Attorney—Fryer, Tjensvold, Feix, Phillips & Lempio ABSTRACT: A multipart spring-loaded assembly having a housing, plunger, spring and end cap is friction welded by holding the housing in a rotating chuck while holding the end cap in a stationary chuck and placing a preload upon the plunger and spring so that they are not in contact with the rotating housing member during the welding operation.

PATENTED APR 27 1971

3,576,068

INVENTORS
JAMES F. JUSTICE
RALPH W. YOCUM

BY
Fryer, Tjensvold, Feix, Phillips & Lempio

ATTORNEYS

FRICTION WELDING A MULTIPART SPRING-LOADED ASSEMBLY

BACKGROUND OF THE INVENTION

This invention relates to improvements in friction welding of the general type wherein two workpieces are subjected to relative rotation while in rubbing contact with each other to generate frictional heat to raise the workpieces to a suitable welding temperature, whereupon the relative rotation subsides and a bond is formed between the workpieces.

The invention is particularly directed to welding a multipart spring-loaded assembly comprising a housing, plunger, spring and end cap wherein the housing and end cap are friction welded to each other to encapsulate the spring and plunger and whereby internal contact between the spring and plunger and the housing member is prevented during the welding operation.

It is also to be understood that the invention is applicable to the inertia friction welding process as described in U.S. Pat. No. 3,273,233 and as set forth below.

In the inertia welding process the energy required to bring the common interface of the parts to a bondable condition is stored as kinetic energy in rotating inertia weights. These weights generally take the form of flywheels and are connected to one of the parts and the entire energy necessary to form the bond is stored in the weights prior to the engagement of the parts at the interface. The stored energy is discharged into the interface through frictional heating and plastic working developed at the interface as the rubbing contact slows the rotating weights and the bonding cycle is concluded.

It is a principal object of the present invention to produce a multipart spring loaded assembly by friction welding an end cap to the open end of a generally U-shaped cylindrical housing member in a manner such that spring loaded elements inside the housing are permanently encapsulated without causing welding between the spring loaded parts and the housing itself.

Other and further objects and advantages of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

DESCRIPTION OF THE PREFERRED EMBODIMENT

Figure 1:
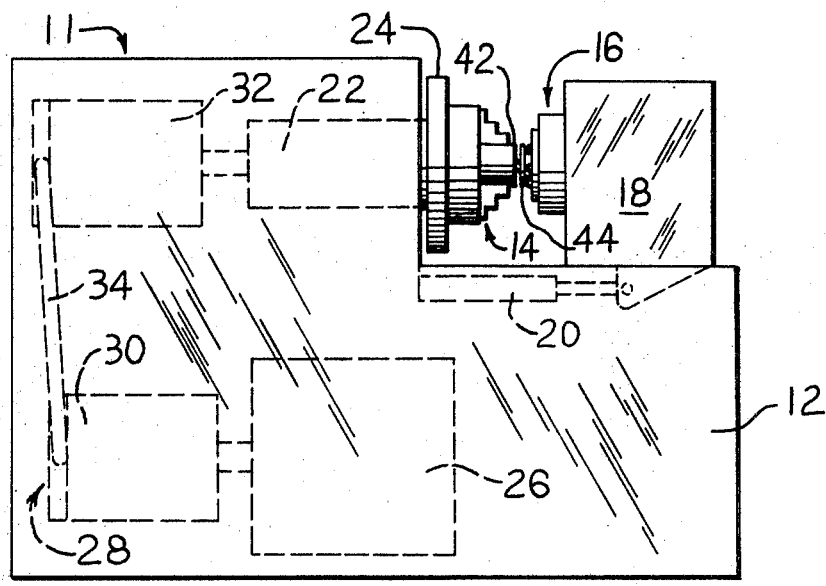
FIG. 1 is a side elevational view illustrating one embodiment of a friction welding machine which may be used to practice the present invention.

A friction welding machine constructed in accordance with one exemplary embodiment of the present invention is indicated generally by the reference numeral 11 in FIG. 1. As shown, the machine comprises a frame or housing structure generally denoted at 12 for housing the various elements of the machine. The two parts to be welded, workpieces 42 and 44, are mounted within chucks 14 and 16.

The chuck 16 does not rotate and is mounted for axial movement on the machine frame 12 under the control of a load cylinder 20. A pressure control circuit, not shown, regulates the pressure in the load cylinder, and thus determines the force under which the parts 42 and 44 are engaged.

The chuck 14 is mounted on a spindle 22, and the chuck and spindle are mounted for rotation within the frame 12. The rotary spindle 22 is adapted to receive flywheels 24 which may be of various size and mass depending upon the particular application of the machine.

An electric motor 26 rotates the spindle through a hydrostatic transmission generally indicated by the reference numeral 28. The hydrostatic transmission includes a hydraulic pump 30, a hydraulic motor 32 and a manifold 34 between the pump and motor.

The drive ratio between the motor and the spindle 22 can be varied by changing the cam angles in either the pump 30 or the motor 32, and the pump and motor can be used to effectively disconnect the motor 26 from the spindle 22 by moving the cam and pump 30 to a position in which the pump 30 does not displace any hydraulic fluid to the motor 32.

It is to be understood that the flywheel weights 24 are mounted on the spindle 22 so that the welding machine 11 can be operated as an inertia welding machine as described in U.S. Pat. No. 3,273,233 and as described in further detail below.

A welding operation to join a first workpiece to a second workpiece can be performed by operating the machine in the following general manner. One of the weld pieces 42 is firmly clamped in the rotatable chuck 14 located on the spindle 22. The other weld piece 44 is firmly clamped in the nonrotatable chuck 16 which is located on the tailstock portion 18 of the machine. Upon actuation of the motor 26, the flywheel and workpiece 42 are accelerated to predetermined velocity.

Once the predetermined velocity has been obtained, the motor 26 is disconnected or shutdown and the ram mechanism 20 is actuated to move tailstock portion 18 and workpiece 44 into contact with the rapidly rotating workpiece 42. As the two workpieces are brought into contact under the upsetting pressure applied through ram 20, heat is generated at the contacting surface or interface of the weld pieces. This heating increases until the workpieces reach the weld temperature, at which time the upsetting pressure, applied by the ram 20 at either a constant or varying pressure, causes flashing or upsetting to occur. During this heating and flashing, the rotational velocity of the spindle member 22 has continued to decrease. At the time the rotation of the spindle ceases, upsetting has taken place and the weld is completed.

Figure 2:
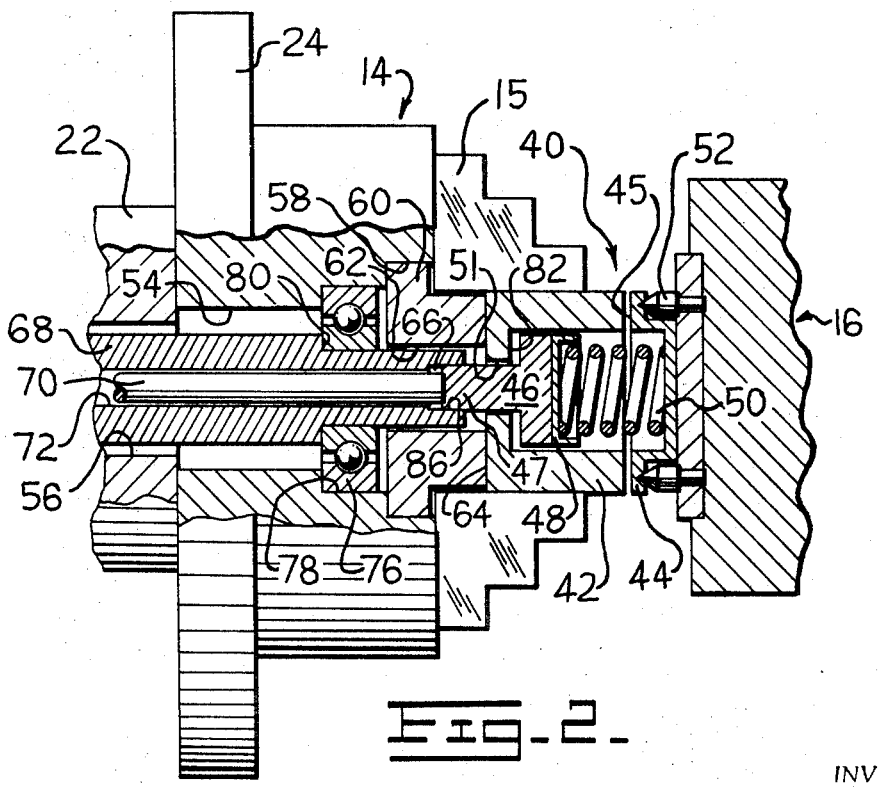
FIG. 2 is a longitudinal view, partially in section, illustrating structural details of both the welding machine and a multipart spring loaded assembly which is to be welded in accordance with the teachings of the present invention.

FIG. 2 illustrates one preferred embodiment of a multipart spring-loaded assembly which is constructed in accordance with the present invention. The assembly, shown generally at 40, comprises a generally U-shaped hollow housing 42, an end cap 44, a plunger 46, a retainer cup 48 and a spring 50.

In order to facilitate a welding operation at the interface 45 between the housing member 42 and the cap 44, the housing member 42 is held rigidly in jaws 15 of the rotatable chuck assembly 14 which is connected to the rotatable spindle 22 of the welding machine. At this stage of the operation the plunger 46, retainer cup 48 and spring 50 are inserted in the housing member 42 with the outer shaft end 47 of the plunger extending through a bore 51 formed in the base portion of the housing member.

The cap member 44 is rigidly held in the nonrotatable chuck 16 such as by means of pins 52 or any other suitable holding mechanism. After the end cap 44 is firmly held against rotation the parts 42 and 44 are moved into close proximity as shown in FIG. 2 preparatory to the beginning of a friction welding operation to join the parts at the interface area denoted at 45.

As further shown in FIG. 2 the chuck assembly 14 and the spindle 22 are formed with aligned central bores 54 and 56, respectively. The central bore 54 of chuck 14 is provided with a first counterbore 58 in which a backup block 60 is seated. The backup block 60 has a hollow bore 62 extending through the center thereof. The backup block 60 abuts the front wall 64 of the assembly housing member 42 so that axial pressure applied during a welding operation will be partially absorbed by the backup block.

The shaft portion 47 of plunger element 46 is preferably square or hex-shaped and fits into a like-shaped cavity 66 which is formed on the end of a tubular member 68. A longitudinally movable loading rod 70 extends through a bore 72 formed in the tubular member 68 and into abutting face-to-face engagement with the end portion 47 of the plunger 46.

A bearing assembly 76 is supported between a second counterbore 78 of chuck 14 and an annular shoulder 80 formed on the tubular member 68. The bearing assembly 76 permits the chuck 14 to rotate without imparting rotation to the tubular member 68.

Due to this construction, the plunger 46, retainer cup 48 and spring 50 can remain stationary while the housing member 42 is rotated. However, in order to keep the plunger 46 from contacting an inner end wall 82 of the housing 42 during rotation, pressure is applied to the loading rod 70 and forces the rod against the plunger 46 to compress the spring 50 between the retainer cup 48 and the end cap 44 as shown in FIG. 2. Thus, the application of pressure through the loading rod 70 to the plunger 46 keeps the plunger from coming into contact with the rotating housing assembly 42 during the welding operation.

It should be understood that in many applications of the invention the loading rod 70 may be eliminated and the end portion 47 of the plunger may be seated in a counterbore 86 formed in the tubular member 68. In this manner, the spring 50 would be compressed between the retainer cup 48 and the end cap 44 as the two weld pieces 42 and 44 are moved into close proximity as shown in FIG. 2.

However, the preferred embodiment of the machine incorporates the loading rod 70 since it permits welding operations to be performed on a wide variety of multipart spring-loaded assemblies having plungers 46 of varying lengths and diameters.

During a friction welding operation the rotatable portion of the welding machine including spindle 22, flywheel 24 and chuck assembly 14 are accelerated to a predetermined velocity. After the predetermined velocity has been attained, a predetermined axial pressure is applied via the ram assembly 20 for bringing the end cap 44 into contact with the rapidly rotating housing assembly 42. Frictional heat generated by the relative motion between the end cap 44 and the housing assembly 42 raises the contacting interface 45 between the two workpieces to the welding temperature at which time upsetting and flashing take place. The rotational velocity of the machine has continued to decrease during the heating and flashing and the machine comes to rest as the weld is completed.

After the weld has been completed pressure on the loading rod 70 is discontinued and the rod 70 is retracted back into the bore 72 of the tubular member 68. At this time the spring 50 forces the retainer cup 48 and the plunger 46 outwardly through the bore 51 formed in the housing assembly 42. However, spring 50 remains somewhat compressed inside the housing assembly to provide the desired amount of preload. The chuck jaws 15 are then loosened and the tailstock assembly 18 is retracted so that the welded multipart assembly 40 may be removed from the machine. The operation may now be repeated.

While we have illustrated and described preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. A method of making an encapsulated assembly by friction welding a cap member to the open end of a generally U-shaped cylindrical housing which housing has a bore in the base portion thereof, said housing containing a plunger having a shaft portion extending through said bore and an enlarged head portion, a spring element received in said housing for exerting a biasing force against the enlarged head portion to force the shaft portion of the plunger outwardly through the housing bore, said method comprising:

moving the cap member into close proximity with the open end of said housing to compress said spring and move said plunger head into contact with the inner wall of the housing base so that the plunger shaft extends outwardly through the housing bore;

applying a loading force to the end of said plunger shaft in a direction opposite to said spring force to move said plunger head portion out of contact with the inner wall of the housing base;

rotating said housing relative to said cap member without imparting rotation to said plunger and spring element; and forcing said housing and said cap member into frictional engagement at their common interface which concentrates heat at the interface until a bond is formed and the rotation stops.

2. A method as set forth in claim 1 wherein said housing is fixedly held in a rotatable chuck having a hollow rotatable spindle associated therewith and wherein a loading rod, for applying force to said plunger shaft during a welding operation, is mounted inside said spindle to permit said spindle to rotate without imparting rotation to the loading rod.